Oct. 27, 1931.   A. GARRIC   1,828,773
AGRICULTURAL MACHINE
Filed June 10, 1929   3 Sheets-Sheet 1

Inventor
André Garric
By B. Singer, Atty.

Oct. 27, 1931.  A. GARRIC  1,828,773
AGRICULTURAL MACHINE
Filed June 10, 1929   3 Sheets-Sheet 3
FIG.8
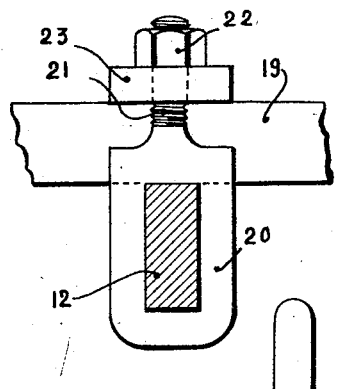
FIG.9
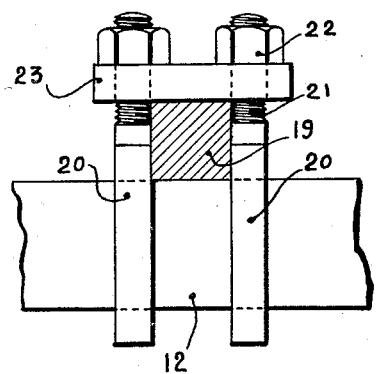
FIG.7
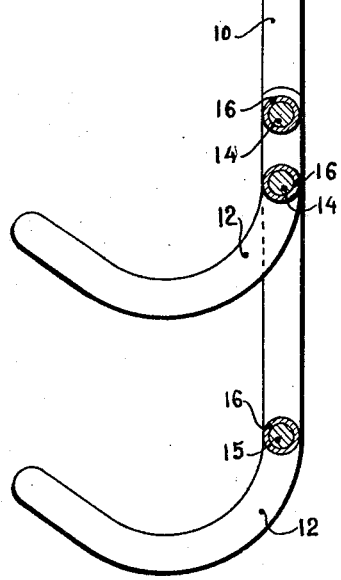
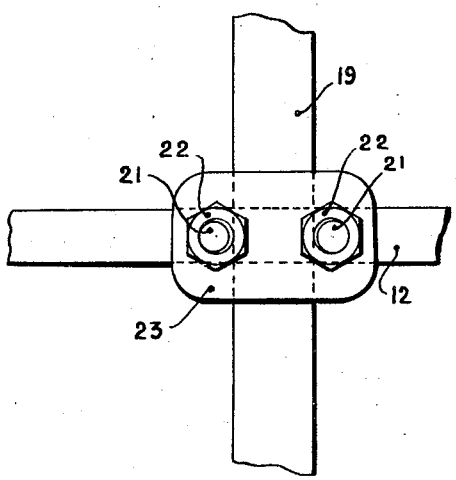
FIG.10
Inventor
André Garric
By B. Singer, Atty.

Patented Oct. 27, 1931

1,828,773

UNITED STATES PATENT OFFICE

ANDRÉ GARRIC, OF LAYRAC, FRANCE

AGRICULTURAL MACHINE

Application filed June 10, 1929, Serial No. 369,742, and in France June 13, 1928.

This invention relates to improvements in agricultural machines such as wheeled cultivators, and the object is to provide improved means for raising and lowering the frame, cultivating implements and the like, by the power of the wheels when the machine is in motion.

With the above and other objects in view, the invention consists in the construction, combination and arrangement of devices hereinafter described and claimed.

In the accompanying drawings

Figure 7 is an elevation partly in section of the cultivator frame.

Figure 8 is a detail transverse sectional view of the same.

Figure 9 is a similar view at right angles to Figure 8.

Figure 10 is a detail plan.

Figure 1:
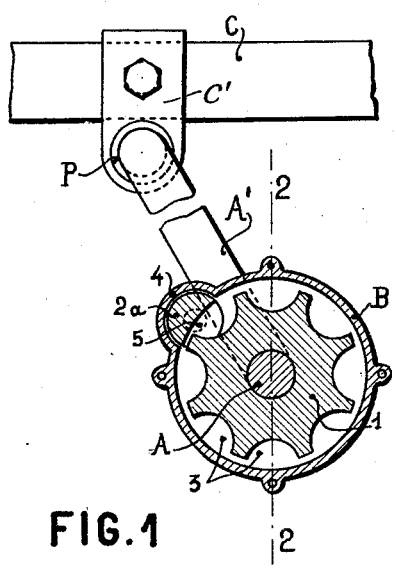
Figure 1 is a detail elevation partly in section of a portion of the frame, the cranked axle and the means operative by the power of the supporting wheels to partly turn the cranked axle as may be required to raise or lower the same.
Figure 2:
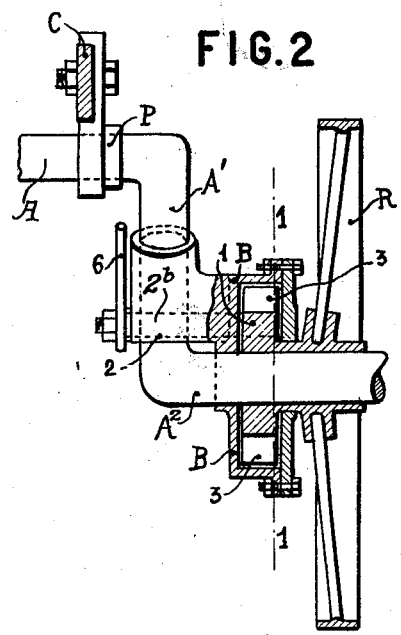
Figure 2 is a similar view at right angles to Figure 1, partly in section, on the plane indicated by the line 2—2 of Figure 1.
Figure 3:
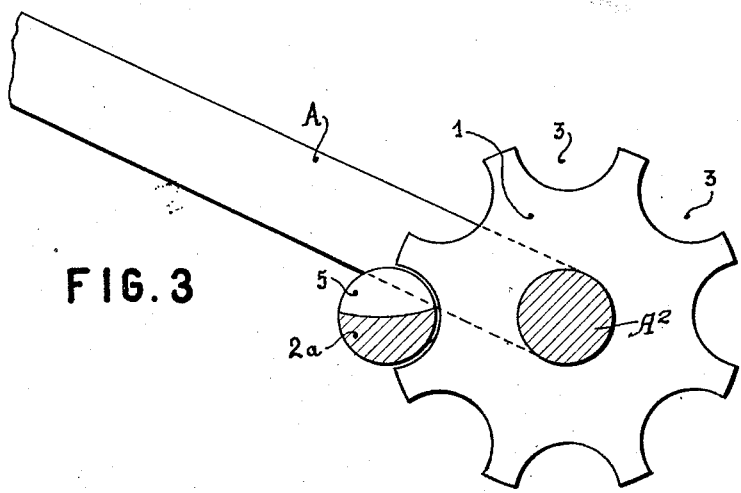
Figure 3 is an enlarged detail elevation partly in section of the cranked axle, one of the wheel discs and one of the keys.
Figure 5:
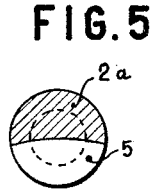
Figure 5 is a detail transverse sectional view of the same.
Figure 4:
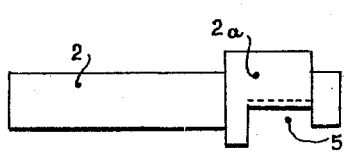
Figure 4 is a detail elevation of the key.

The frame of the machine is indicated at C and is provided with supporting members C' which have bearings P for the intermediate portion of the cranked axle A. The crank arms A' of the axle have outwardly extending spindles $A^2$ on which the supporting wheels R are mounted for rotation, the hub of each such wheel being provided on the inner side with a disc 1 which has peripheral substantially semi-circular recesses 3 which are spaced equidistant apart and are all of the same diameter. Each crank arm A' has a housing member B in which one of the discs 1 is arranged for rotation, each housing member also having a sleeve 3 through which the arm A passes, so that the housing member is mounted on and secured to the cranked axle. Each sleeve has a bearing $2^b$ for the shaft 2 of a key $2^a$. The said key is cylindrical, is concentric with its shaft and is provided on one side with a substantially semi-circular recess 5, the bottom of which is curved and the radius of which is very slightly greater than that of the disc, the key being arranged eccentrically of the disc and adapted to extend across the peripheral portion of the disc when the key is coincident with one of the disc recesses.

It will be understood from the foregoing and by reference to Figures 1 to 5 of the drawings, that when the key is turned so that its recess 5 is presented to the periphery of the disc, the latter may be turned by the wheel R (Figure 1). It will also be understood that when the key is turned into engagement with one of the disc recesses as in Figure 3, the disc will be locked to the cranked axle and hence, assuming that the machine is in motion, the rotation of the wheels R will be communicated to the cranked axle through the discs and keys and the cranked axle will be partly turned so as to raise the intermediate portion thereof and hence also the frame C. At the instant the cranked axle has been turned to the desired extent, the operator by means of suitable cords, rods or other suitable appliances, can turn the shafts 2 by means of levers 6 with which they are provided, so as to disengage the keys from the discs and permit the independent continued rotation of the wheels and discs.

Any suitable means may be employed for locking the cranked axle against partial rotation, such for instance as a toothed segment on the axle and a lever having a dog for engagement with the toothed segment. Any suitable means such as are commonly employed may be used for this purpose.

Figure 6:
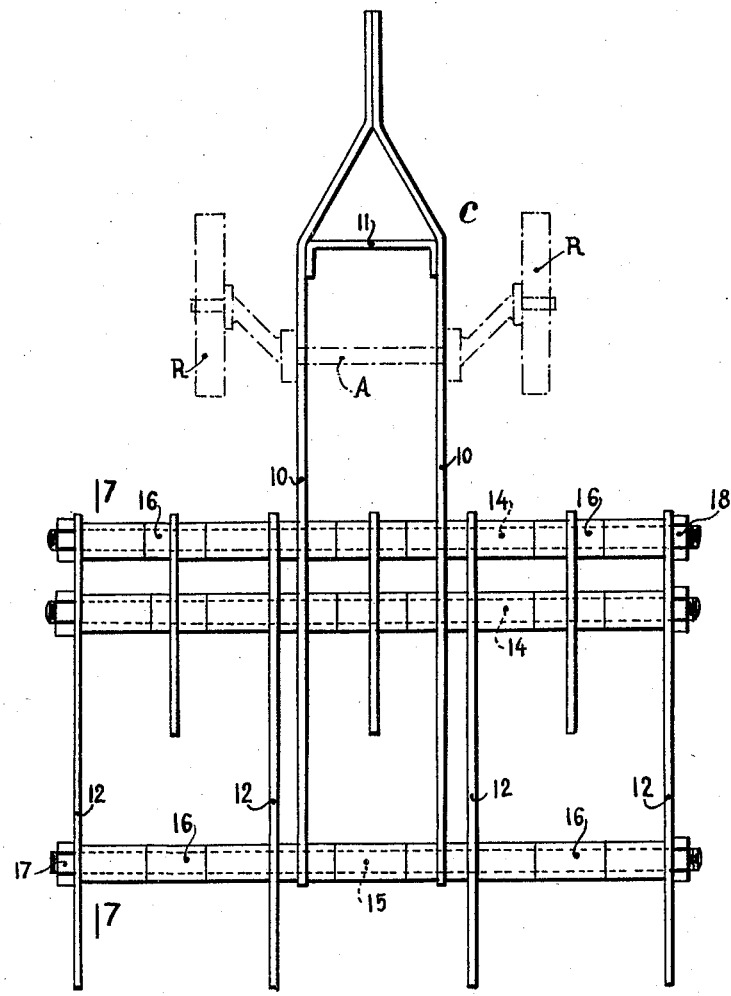
Figure 6 is a plan of the machine with the cranked axle and supporting wheels indicated in dotted lines.

The frame C comprises a pair of longitudinal bars 10 which are appropriately spaced apart and which have inwardly turned front ends united together as shown in Figure 6 and are connected together at a suitable distance from their front ends by a cross bar 11. The bars 10 are provided at suitably spaced points with transverse openings through which extend cross rods 14, 15. Tubular spacer members 16 of any suitable number are arranged on said cross rods and bars or beams 12 which are similar to but shorter than the bars or beams 10 are also arranged on said cross rods at suitable distances apart and are held in appropriately spaced relation by the members 16, nuts 17, 18 being threaded on the said cross rods as shown to hold all the members of the assembly in place. Any suitable cultivating implements, such as shovels, tongues or the like, may be attached to the standard portions of the members 10, 12, as will be understood.

In Figures 8, 9 and 10 I show a modified construction of the frame, in which the cross bars 19 are square in cross section and the bars or beams 12 are secured thereto by clip bolts 20 and plates 23 which are secured on the threaded portions 21 of the clip bolts, above the members 19 by nuts 22. By first loosening the nuts the clip bolts and hence also the bars or beams 10, 12 may be adjusted laterally of the frame on the cross rods 19 to widen or narrow the frame as may be desired.

What I claim is:

1. In a machine of the class described, a frame, a cranked axle having its intermediate portion mounted in bearings with which the frame is provided, supporting wheels mounted on spindles with which the arms of the cranked axle are provided, a toothed disc attached to and revoluble with each supporting axle, bearing members on the arms of the cranked axle and keys revolubly mounted in said bearing members and engageable with or disengaged from the teeth of the discs according to the direction in which said keys are turned, and means for turning said keys.

2. A machine as claimed in claim 1 in which the discs are provided with peripheral substantially semi-circular recesses between which the teeth are formed and in which the keys are circular in cross section and provided on one side with a substantially semi-circular recess to afford clearance for the discs when said keys are so turned as to present their recesses to the peripheries of the discs.

In witness whereof I affix my signature.

ANDRÉ GARRIC.